US012088017B2

(12) United States Patent
Wu et al.

(10) Patent No.: US 12,088,017 B2
(45) Date of Patent: Sep. 10, 2024

(54) RADIATING ELEMENT, ANTENNA ASSEMBLY AND BASE STATION ANTENNA

(71) Applicant: CommScope Technologies LLC, Hickory, NC (US)

(72) Inventors: Runmiao Wu, Suzhou (CN); Bo Wu, Suzhou (CN); YueMin Li, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 251 days.

(21) Appl. No.: 17/782,847

(22) PCT Filed: Dec. 14, 2020

(86) PCT No.: PCT/US2020/064761
§ 371 (c)(1),
(2) Date: Jun. 6, 2022

(87) PCT Pub. No.: WO2021/133577
PCT Pub. Date: Jul. 1, 2021

(65) Prior Publication Data

US 2023/0017375 A1 Jan. 19, 2023

(30) Foreign Application Priority Data

Dec. 24, 2019 (CN) ........................ 201911341589.0

(51) Int. Cl.

| | |
|---|---|
| ***H01Q 21/26*** | (2006.01) |
| ***H01Q 1/24*** | (2006.01) |
| ***H01Q 1/36*** | (2006.01) |
| ***H01Q 5/42*** | (2015.01) |

(52) U.S. Cl.
CPC ............... *H01Q 21/26* (2013.01); *H01Q 1/24* (2013.01); *H01Q 1/246* (2013.01); *H01Q 1/36* (2013.01); *H01Q 5/42* (2015.01)

(58) Field of Classification Search
CPC .......... H01Q 21/26; H01Q 1/246; H01Q 1/36; H01Q 5/42; H01Q 1/24
See application file for complete search history.

(56) References Cited

U.S. PATENT DOCUMENTS

| | | | | |
|---|---|---|---|---|
| 5,929,729 | A | 7/1999 | Swarup | |
| 7,868,843 | B2 * | 1/2011 | Borau | H01Q 1/523 343/797 |
| 10,389,018 | B2 * | 8/2019 | Daojian | H01Q 1/36 |
| 2005/0253769 | A1 * | 11/2005 | Timofeev | H01Q 21/08 343/810 |

(Continued)

OTHER PUBLICATIONS

"International Search Report and Written Opinion of the International Searching Authority", International Application No. PCT/US2020/064761, Apr. 1, 2021, 15 pp.

*Primary Examiner* — Hai V Tran
(74) *Attorney, Agent, or Firm* — Myers Bigel, P.A.

(57) ABSTRACT

A radiating element comprises a first radiator having first and second dipole arms that each include a narrowed arm segment and a widened arm segment and a second radiator having third and fourth dipole arms that each include a narrowed arm segment and a widened arm segment, a first feed line configured to feed a first polarized RF signal to the first through fourth dipole arms, and a second feed line configured to feed a second polarized RF signal to the first through fourth dipole arms.

17 Claims, 9 Drawing Sheets

(56) References Cited

U.S. PATENT DOCUMENTS

| | | | | |
|---|---|---|---|---|
| 2006/0273865 | A1* | 12/2006 | Timofeev | H01Q 3/36 333/161 |
| 2010/0238087 | A1* | 9/2010 | Jung | H01Q 9/26 343/810 |
| 2011/0298682 | A1* | 12/2011 | Plet | H01Q 21/06 343/797 |
| 2012/0146869 | A1* | 6/2012 | Holland | H01Q 21/26 343/795 |
| 2015/0116174 | A1 | 4/2015 | Yona et al. | |
| 2015/0200460 | A1 | 7/2015 | Isom et al. | |
| 2017/0222306 | A1 | 8/2017 | Biscontini et al. | |
| 2018/0323513 | A1 | 11/2018 | Varnoosfaderani et al. | |
| 2020/0127389 | A1* | 4/2020 | Li | H01Q 25/001 |

* cited by examiner

RADIATING ELEMENT, ANTENNA ASSEMBLY AND BASE STATION ANTENNA

CROSS-REFERENCE TO RELATED APPLICATIONS

The present application is a 35 U.S.C. § 371 national stage application of PCT Application No. PCT/US2020/064761, filed on Dec. 14, 2020, which itself claims priority to Chinese Patent Application No. 201911341589.0, filed Dec. 24, 2019, the entire contents of both of which are incorporated herein by reference as if set forth fully herein.

FIELD

The present invention generally relates to radio communications and, more particularly, to radiating elements, antenna assemblies and base station antennas for cellular communications systems.

BACKGROUND

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station.

In many cases, each base station is divided into "sectors". In perhaps the most common configuration, a hexagonally shaped cell is divided into three 120° sectors, and each sector is served by one or more base station antennas that have an azimuth Half Power Beam width (HPBW) of approximately 65°. Typically, the base station antennas are mounted on a tower structure, with the radiation patterns (also referred to herein as "antenna beams") that are generated by the base station antennas directed outwardly. Base station antennas are often implemented as linear or planar phased arrays of radiating elements.

In order to accommodate the ever-increasing volumes of cellular communications, cellular operators have added cellular services in a variety of new frequency bands. While in some cases it is possible to use linear arrays of so-called "wide-band" or "ultra wide-band" radiating elements to provide service in multiple frequency bands, in other cases it is necessary to use different linear arrays (or planar arrays) of radiating elements to support service in the different frequency bands.

As the number of frequency bands has proliferated, increased sectorization has become more common (e.g., dividing a cell into six, nine or even twelve sectors), the number of base station antennas deployed at a typical base station has increased significantly. However, due to local zoning ordinances and/or weight and wind loading constraints for the antenna towers, etc. there is often a limit as to the number of base station antennas that can be deployed at a given base station. In order to increase capacity without further increasing the number of base station antennas, so-called multi-band base station antennas have been introduced in which multiple linear arrays of radiating elements are included in a single antenna. One very common multi-band base station antenna includes one linear array of "low-band" radiating elements that are used to provide service in some or all of the 617/698-960 MHz frequency band, and two linear arrays of "high-band" radiating elements that are used to provide service in some or all of the 1427/1695-2690 MHz frequency band. These linear arrays of low-band and high-band radiating elements are typically mounted in side-by-side fashion.

There is also significant interest in base station antennas that include two linear arrays of low-band radiating elements and two (or four) linear arrays of high-band radiating elements. These antennas may be used in a variety of applications including 4×4 multi-input-multi-output ("MIMO") applications or as multi-band antennas having two different low-bands (e.g., a 700 MHz low-band linear array and an 800 MHz low-band linear array) and two different high-bands (e.g., an 1800 MHz high-band linear array and a 2100 MHz high-band linear array). These antennas, however, are challenging to implement in a commercially acceptable manner because achieving a 65° azimuth HPBW antenna beam in the low-band typically requires low-band radiating elements that are at least 200 mm wide. But, when two arrays of low-band radiating elements are placed side-by-side with high-band linear arrays therebetween, a base station antenna having a width of about 500 mm may be required. Such large antennas may have very high wind loading, may be very heavy, and/or may be expensive to manufacture. Operators would prefer base station antennas having widths of about 430 mm or less (for example, 400 mm, 380 mm).

To achieve antennas having two low-band arrays and two high band arrays, the dimensions of the low-band radiating elements may be reduced and/or the lateral spacing between the linear arrays may be reduced. Unfortunately, as the linear arrays of radiating elements are aligned closer together, the degree of signal coupling between the linear arrays can increase significantly. For example, the coupling interference between the low-band radiating elements or between the high-band radiating elements may increase; the low-band radiating element may produce large scattering effects on the high-band radiating elements below. This "parasitic" coupling can lead to an undesired increase in HPBW. Similarly, any reduction in the dimensions of the low-band radiating elements will often cause an increase in HPBW.

The radiating elements used in modern base station antennas typically transmit and receive RF signals with linear polarizations. Most base station antennas have dual-polarized radiating elements that transmit and receive RF signals at two orthogonal linear polarizations. While a small percentage of modern base station antennas include radiating elements that transmit and receive RF signals at vertical and horizontal polarizations, the vast majority of dual-polarized radiating elements are configured to transmit and receive RF signals at +45° and −45° polarizations. Such radiating elements are typically referred to as +/−45° polarized radiating elements. Conventional+/−45° polarized radiating elements include a +45° polarized dipole radiator and a −45° polarized dipole radiator that are connected to respective first and second feed networks.

SUMMARY

According to a first aspect of the present invention, there is a radiating element provided. The radiating element comprises a first radiator having a first dipole arm and a second dipole arm, wherein the first dipole arm and the second dipole arm each include a narrowed arm segment and a widened arm segment; a second radiator having a third dipole arm and a fourth dipole arm, wherein the third dipole arm and the fourth dipole arm each include a narrowed arm segment and a widened arm segment; a first feed line configured to feed a first polarized radio frequency signal to the first dipole arm, the second dipole arm, the third dipole arm, and the fourth dipole arm; and a second feed line configured to feed a second polarized radio frequency signal to the first dipole arm, the second dipole arm, the third dipole arm, and the fourth dipole arm.

The radiating element according to the present invention can effectively improve the radiation pattern of the antenna.

In some embodiments, the first feed line includes a first stripline segment configured to feed the first polarized radio frequency signal to the first dipole arm and the fourth dipole arm, and a second stripline segment configured to feed the first polarized radio frequency signal to the second dipole arm and the third dipole arm; and the second feed line includes a third stripline segment configured to feed the second polarized radio frequency signal to the first dipole arm and the third dipole arm, and a fourth stripline segment configured to feed the second polarized radio frequency signal to the second dipole arm and the fourth dipole arm.

In some embodiments, the radiating element includes a first conductive structure, on which the first dipole arm is mounted; a second conductive structure, on which the second dipole arm is mounted; a third conductive structure, on which the third dipole arm is mounted; and a fourth conductive structure, on which the fourth dipole arm is mounted.

In some embodiments, the first stripline segment is disposed in a feeding gap between the first conductive structure and the fourth conductive structure, and the second stripline segment is disposed in a feeding gap between the second conductive structure and the third conductive structure; and the third stripline segment is disposed in a feeding gap between the first conductive structure and the third conductive structure, and the fourth stripline segment is disposed in a feeding gap between the second conductive structure and the fourth conductive structure.

In some embodiments, each dipole arm includes a first conductive path and a second conductive path, the first conductive path and the second conductive path each including at least one narrowed arm segment and at least one widened arm segment.

In some embodiments, the first conductive path and the second conductive path form a conductive loop.

In some embodiments, the lower limit of the ratio of a length to a width of each dipole arm is: 1.5, 1.75, 2, 2.25, 2.5, 3, 3.5, 4 or 5.

In some embodiments, at least one widened arm segment in each dipole arm is a non-planar widened arm segment that includes a first widened arm subsegment extending in a first direction, and a second widened arm subsegment extending from the first widened arm subsegment in a second direction, wherein the second direction is different from the first direction.

In some embodiments, the second direction and the first direction form an angle between 80 degrees and 100 degrees.

In some embodiments, each radiator has a length of between 150 mm and 200 mm or a length of between 170 mm and 180 mm.

In some embodiments, each dipole arm is configured as a sheet metal arm or PCB based arm.

In some embodiments, the first feed line and the second feed line are each configured as a hook-shaped feed line.

In some embodiments, the first feed line and the second feed line each include a first stripline segment, a second stripline segment, and a feed segment between the first and second stripline segments.

In some embodiments, the first feed line and the second feed line form a first cross pattern, and the first radiator and the second radiator form a second cross pattern, wherein the first cross pattern is rotated at an angle relative to the second cross pattern.

In some embodiments, the first cross pattern is rotated with respect to the second cross pattern by 45°.

In some embodiments, each of the conductive structures is electrically connected to a ground layer of a feed board, and the radiating element is mounted on the feed board; or each conductive structure is coupled to a reflector.

In some embodiments, each of the first and second feed lines is electrically connected to a respective transmission line on a feed board, and the radiating element is mounted on the feed board; or each of the first and second feed lines is electrically connected to an inner conductor of a respective cable.

In some embodiments, the first polarization is +45° polarization and the second polarization is −45° polarization.

In some embodiments, the first feed line is mounted on a dielectric element, the dielectric element being located between the conductive structure and the first feed line.

In some embodiments, the radiating element includes a first feeding structure and a second feeding structure, the first feeding structure having a first engaging slot on an end away from the reflector, the second feeding structure having a second engaging slot on an end close to the reflector, and the first feeding structure and the second feeding structure being cross-engaged with each other by means of the first engaging slot and the second engaging slot.

In some embodiments, the first feeding structure and the second feeding structure are each configured as a multilayer printed circuit board.

In some embodiments, the first feeding structure includes a first metal pattern, two ground layers on each side of the first metal pattern, and two dielectric layers respectively between the ground layers and the first metal pattern, wherein the first metal pattern includes the first feed line; and the second feeding structure includes a second metal pattern, two ground layers on each side of the second metal pattern, and two dielectric layers respectively between the ground layers and the second metal pattern, wherein the second metal pattern includes the second feed line.

In some embodiments, the first feeding structure and the second feeding structure each include a first half and a second half, the first stripline segment being in the first half of the first feeding structure, and the second stripline segment being in the second half of the first feeding structure, the third stripline segment being in the first half of the second feeding structure, and the fourth stripline segment being in the second half of the second feeding structure.

In some embodiments, the first half and the second half have protrusions on their ends remote from the reflector, and the protrusions are configured for mounting of the first radiator and the second radiator of the radiating element.

In some embodiments, the protrusion has metal regions on both sides, which are part of a ground layer of the respective feeding structure, the first dipole arm being soldered to the protrusion of the first half of the first feeding structure and the protrusion of the first half of the second feeding structure; the second dipole arm being soldered to the protrusion of the second half of the first feeding structure and the protrusion of the second half of the second feeding structure; the third dipole arm being soldered to the protrusion of the second half of the first feeding structure and the protrusion of the first half of the second feeding structure; and the fourth dipole arm being soldered to the protrusion of the first half of the first feeding structure and the protrusion of the second half of the second feeding structure.

In some embodiments, the first radiator is configured as a vertically extending radiator, and the second radiator is configured as a horizontally extending radiator.

In some embodiments, the radiating element is configured to operate in 617-960 MHz frequency range or a portion thereof.

According to a second aspect of the present invention, a radiating element is provided that includes a first radiator having a first dipole arm and a second dipole arm; a second radiator having a third dipole arm and a fourth dipole arm; a first feed line configured to feed a radio frequency signal of +45° polarization to the first dipole arm, the second dipole arm, the third dipole arm, and the fourth dipole arm; and a second feed line configured to feed a radio frequency signal of −45° polarization to the first dipole arm, the second dipole arm, the third dipole arm, and the fourth dipole arm. Each dipole arm includes a first conductive path and a second conductive path, the first conductive path and the second conductive path each including at least one narrowed arm segment and at least one widened arm segment, wherein the first conductive path and the second conductive path form a conductive loop.

In some embodiments, the lower limit of the ratio of a length to a width of each dipole arm is: 1.5, 1.75, 2, 2.25, 2.5, 3, 3.5, 4 or 5.

In some embodiments, at least one widened arm segment in each dipole arm is a non-planar widened arm segment that includes a first widened arm subsegment extending in a first direction, and a second widened arm subsegment extending from the first widened arm subsegment in a second direction, wherein the second direction is different from the first direction.

In some embodiments, the second direction and the first direction form an angle between 80 degrees and 100 degrees.

In some embodiments, the upper limit of the ratio of an area of one high-band radiating element covered by one low-band radiating element in a forward direction to an area of the dipole arm of the low-band radiating element is: 0.5, 0.4, 0.3, 0.2, 0.1, or 0.

According to a third aspect of the present invention, an antenna assembly is provided that includes a reflector and an antenna array mounted on the reflector, the antenna array including a plurality of vertically extending arrays, characterized in that the plurality of vertically extending arrays include a first array including a plurality of first radiating elements. The first radiating elements includes a first radiator extending vertically, the first radiator having a first dipole arm and a second dipole arm, wherein the first dipole arm and the second dipole arm each include a narrowed arm segment and a widened arm segment; a second radiator extending horizontally, the second radiator having a third dipole arm and a fourth dipole arm, wherein the third dipole arm and the fourth dipole arm each include a narrowed arm segment and a widened arm segment; a first feed line configured to feed a first polarized radio frequency signal to the first dipole arm, the second dipole arm, the third dipole arm, and the fourth dipole arm; and a second feed line configured to feed a second polarized radio frequency signal to the first dipole arm, the second dipole arm, the third dipole arm, and the fourth dipole arm.

In some embodiments, the plurality of vertically extending arrays include a second array including a plurality of second radiating elements, wherein the second radiating element includes a third radiator extending at an angle of +45°, the third radiator having a fifth dipole arm and a sixth dipole arm and a fourth radiator extending at an angle of −45°, the fourth radiator having a seventh dipole arm and an eighth dipole arm.

In some embodiments, the fifth and sixth dipole arms each include a narrowed arm segment and a widened arm segment, and the seventh and eighth dipole arms each include a narrowed arm segment and a widened arm segment.

In some embodiments, the first radiating elements in the first array and the second radiating elements in the second array are disposed adjacent to each other in a horizontal direction.

DETAILED DESCRIPTION

Figure 1:
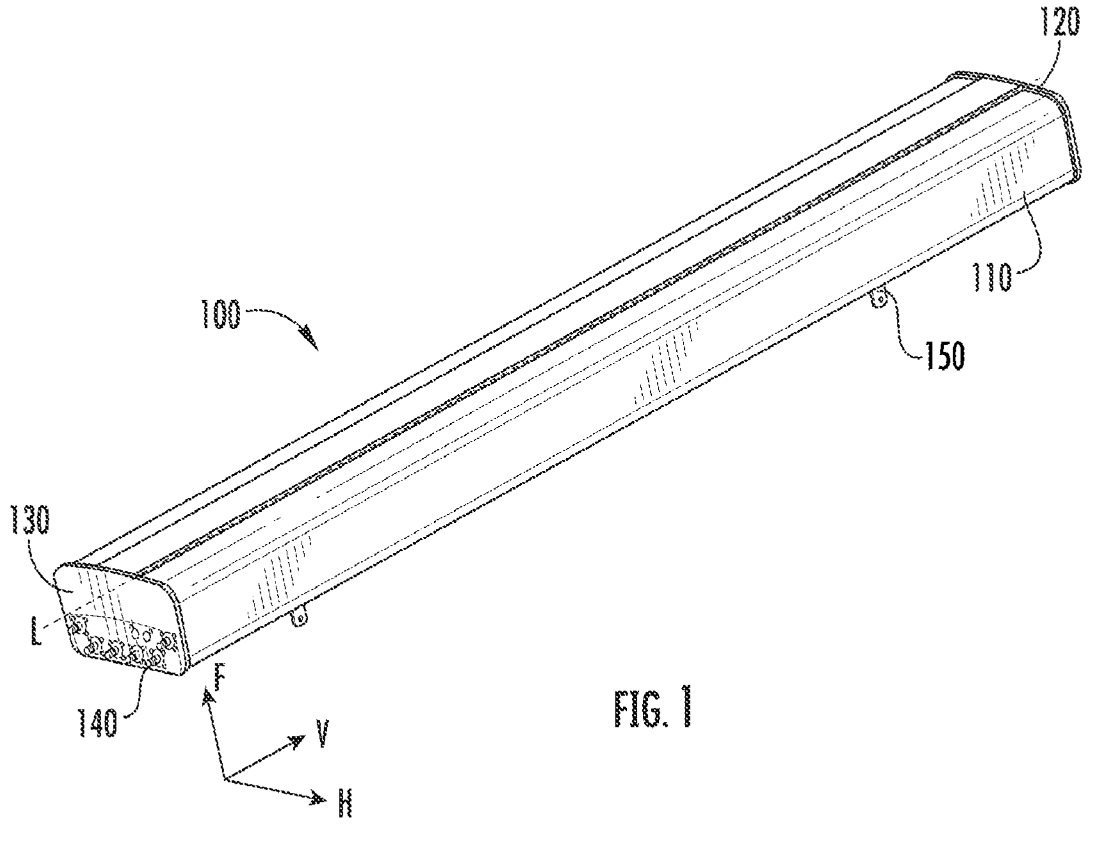
FIG. 1 is a schematic perspective view of a base station antenna according to some embodiments of the present invention.

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

It should be understood that, in all the drawings, the same reference signs present the same elements. In the drawings, for the sake of clarity, the sizes of certain features may be modified.

It should be understood that, the wording in the specification is only used for describing particular embodiments and is not intended to limit the present invention. All the terms used in the specification (including technical and scientific terms) have the meanings as normally understood by a person skilled in the art, unless otherwise defined. For the purpose of conciseness and/or clarity, the well-known functions or constructions may not be described in detail any longer.

The singular forms "a/an", "said" and "the" as used in the specification, unless clearly indicated, all contain the plural forms. The words "comprising", "containing" and "including" used in the specification indicate the presence of the claimed features, but do not preclude the presence of one or more additional features. The wording “and/or” as used in the specification includes any and all combinations of one or more of the items listed. The phases “between X and Y” and “between about X and Y” as used in the specification should be construed as including X and Y. As used herein, phrases such as “between about X and Y” mean “between about X and about Y”. As used herein, phrases such as “from about X to Y” mean “from about X to about Y.”

In the specification, when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being “directly on”, “directly attached” to, “directly connected” to, “directly coupled” with or “directly contacting” another element, there are no intervening elements present. In the specification, where one feature is arranged to be “adjacent” to another feature, it may mean that one feature has a portion that overlaps with an adjacent feature or a portion that is located above or below an adjacent feature.

In the specification, words describing spatial relationships such as “up”, “down”, “left”, “right”, “forth”, “back”, “high”, “low” and the like may describe a relation of one feature to another feature in the drawings. It should be understood that these terms also encompass different orientations of the apparatus in use or operation, in addition to encompassing the orientations shown in the drawings. For example, when the apparatus shown in the drawings is turned over, the features previously described as being “below” other features may be described to be “above” other features at this time. The apparatus may also be otherwise oriented (rotated 90 degrees or at other orientations) and the relative spatial relationships will be correspondingly altered.

The radiating elements according to embodiments of the present invention are applicable to various types of base station antennas, for example, they may be suitable for multi-band base station antennas or MIMO antennas.

Embodiments of the present invention will now be described in more detail with reference to the accompanying drawings.

Figure 2:
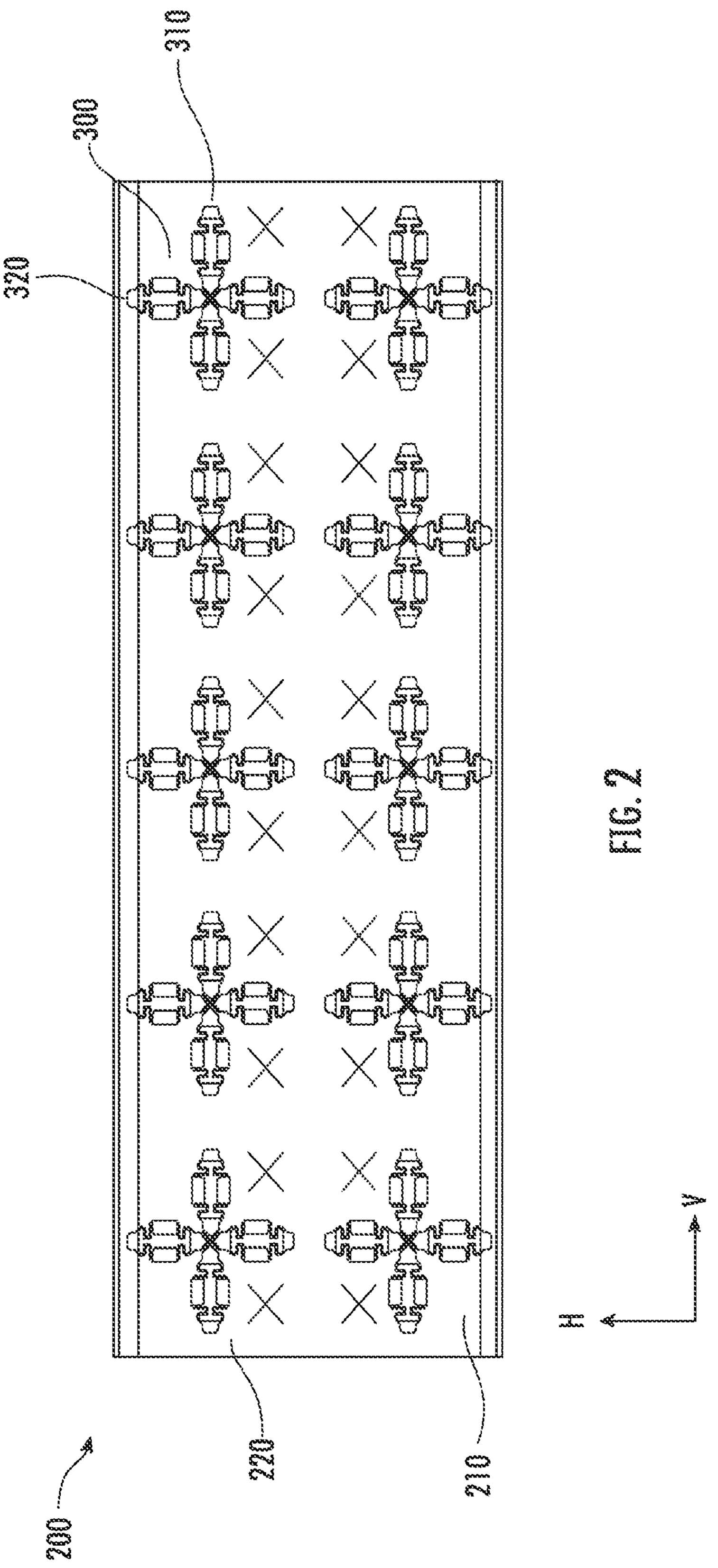
FIG. 2 is a schematic front view of an antenna assembly in the base station antenna of FIG. 1.

FIG. 1 is a schematic perspective view of a base station antenna 100 according to some embodiments of the present invention. FIG. 2 is a schematic front view of an antenna assembly 200 in the base station antenna 100 of FIG. 1.

As shown in FIG. 1, the base station antenna 100 is an elongated structure that extends along a longitudinal axis L. The base station antenna 100 may have a tubular shape with a generally rectangular cross-section. The base station antenna 100 includes a radome 110 and a top end cap 120. In some embodiments, the radome 110 and the top end cap 120 may comprise a single integral unit, which may be helpful for waterproofing the base station antenna 100. One or more mounting brackets 150 are provided on the rear side of the radome 110 which may be used to mount the base station antenna 100 onto an antenna mount (not shown) on, for example, an antenna tower. The base station antenna 100 also includes a bottom end cap 130 which includes a plurality of connectors 140 mounted therein. The base station antenna 100 is typically mounted in a vertical configuration (i.e., the longitudinal axis L may be generally perpendicular to a plane defined by the horizon when the base station antenna 100 is mounted for normal operation).

As shown in FIG. 2, the base station antenna 100 includes an antenna assembly 200 that may be slidably inserted into the radome 110. The antenna assembly 200 includes a reflector 210 and a plurality of radiating elements 300 mounted on the reflector 210. The reflector 210 may be used as a ground plane structure for the radiating elements 300. The radiating elements 300 are mounted to extend forwardly (in a forward direction F) from the reflector 210. The radiating elements 300 may include low-band radiating elements and high-band radiating elements, and the low-band radiating elements extend farther forward than the high-band radiating elements. The low-band radiating elements may be configured to transmit and receive RF signals in a first frequency band such as, for example, the 617-960 MHz frequency range or a portion thereof. The high-band radiating elements may be configured to transmit and receive RF signals in a second frequency band such as, for example, the 1427-2690 MHz frequency range or a portion thereof.

In the embodiment shown in FIG. 2, the low-band radiating elements 300 may be mounted in two vertical columns to form two vertically-disposed linear arrays of low-band radiating elements 300. The high-band radiating elements (represented by simplified crosses)may also be mounted in two vertical columns to form two vertically-disposed linear arrays of high-band radiating elements. In other embodiments, more than two linear arrays of low-band radiating elements 300 and/or the high-band radiating elements may be provided.

In some embodiments, the linear arrays 220 may extend substantially along the entire length of the base station antenna 100. In other embodiments, the linear arrays 220 may extend only partially along the length of the base station antenna 100. The linear arrays 220 may extend in a vertical direction V, which may be the direction of a longitudinal axis L of the base station antenna 100 or may be parallel to the longitudinal axis L. The vertical direction V is perpendicular to a horizontal direction H and a forward direction F (see FIG. 1).

Next, a radiating element 300 according to some embodiments of the present invention will be described in more detail with the reference to FIGS. 3 to 7.

Figure 3:
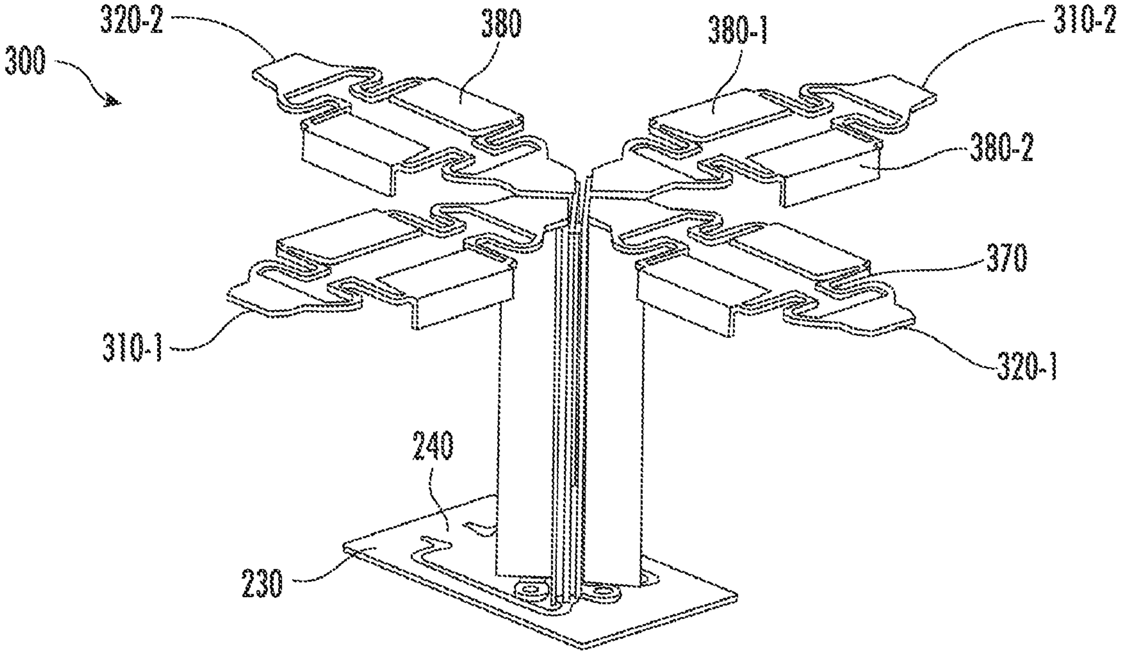
FIG. 3 is a schematic perspective view of a radiating element in the antenna assembly of FIG. 2.
Figure 4:
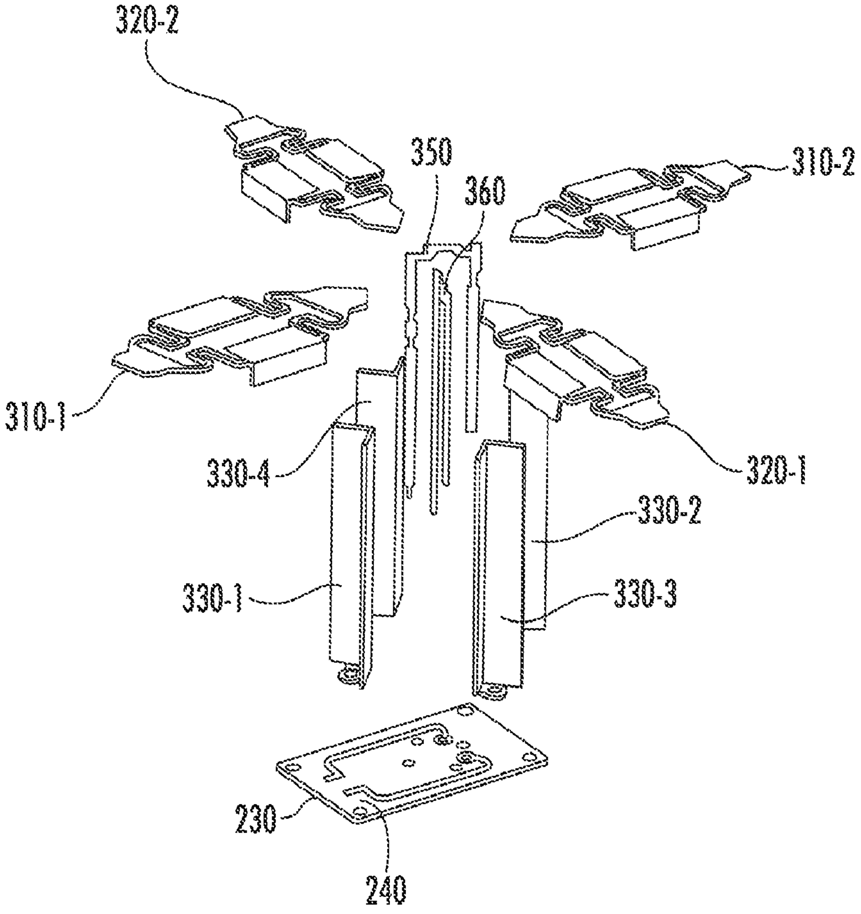
FIG. 4 is a schematic exploded perspective view of the radiating element in FIG. 3.
Figure 5:
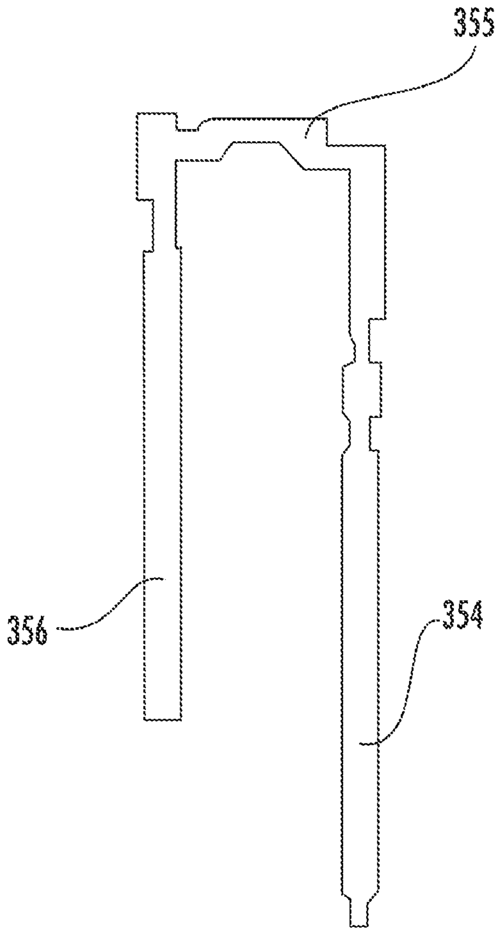
FIG. 5 is a schematic view of a feed line of the radiating element in FIGS. 3 and 4.
Figure 6:
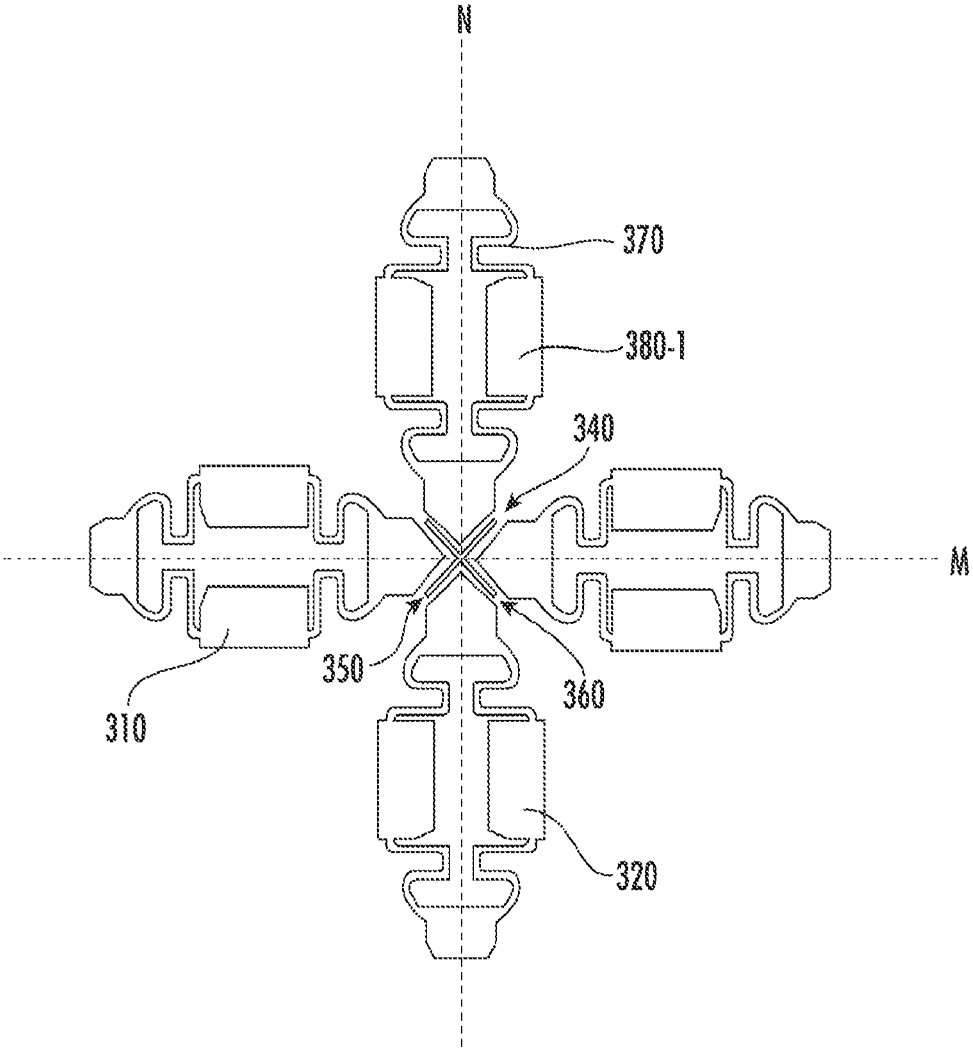
FIG. 6 is a schematic front view of the radiating element in FIG. 3.
Figure 7:
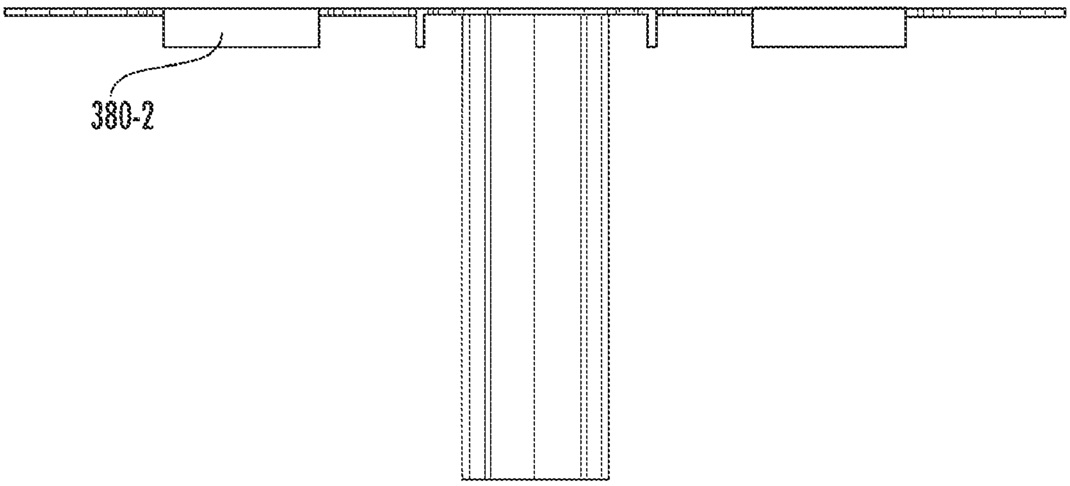
FIG. 7 is a schematic side view of the radiating element in FIG. 3.

Refer to FIGS. 3 to 7, where FIG. 3 is a schematic perspective view of the radiating element 300 according to some embodiments of the present invention; FIG. 4 is a schematic exploded perspective view of the radiating element 300 in FIG. 3; FIG. 5 is a schematic view of a feed line of the radiating element in FIGS. 3 and 4; FIG. 6 is a schematic front view of the radiating element 300 in FIG. 3; and FIG. 7 is a schematic side view of the radiating element 300 in FIG. 3.

The radiating element 300 may include dipole radiators formed using sheet metal. Such dipole radiators may be referred to herein as “sheet metal radiators”. Compared with the printed circuit board-based dipole radiators, the sheet metal radiators are advantageous in that: firstly, the sheet metal radiators are lower in cost; secondly, the sheet metal radiators may be formed to have any desired thickness, and hence may exhibit improved impedance matching and/or reduced signal transmission losses; thirdly, the sheet metal radiators may be readily provided with low levels of surface roughness, which may result in improved passive intermodulation (“PIM”) distortion performance.

The radiating elements 300 may be configured as low-band radiating elements, which may be configured to transmit and receive RF signals in a frequency band such as, for example, the 617-960 MHz frequency range or a portion thereof. The radiating elements 300 may be wideband radiating elements.

FIG. 3 shows one radiating element 300 mounted on a printed circuit board feed board 230. The feed board 230 may include an RF transmission line feeding source 240 that passes RF signals to and from radiating element 300 via a transmission line.

Referring to FIGS. 3, 4 and 6, the radiating element 300 includes cross-dipole radiators, conductive structures, and feed lines.

The cross-dipole radiators of the radiating element 300 include a first radiator 310 and a second radiator 320. The first radiator 310 includes a first dipole arm 310-1 and a second dipole arm 310-2 that each extend along a first axis m, and the second radiator 320 includes a third dipole arm 320-1 and a fourth dipole arm 320-2 that each extend along a second axis n, the first axis m being substantially perpendicular to the second axis n.

The radiating element 300 may include four conductive structures 330-1 through 330-4. The first dipole arm 310-1 of the first radiator 310 may be mounted on the first conductive structure 330-1 and the second dipole arm 310-2 of the first radiator 310 may be mounted on the second conductive structure 330-2, which is opposite the first conductive structure 330-1. The third dipole arm 320-1 of the second radiator 320 may be mounted on the third conductive structure 330-3 and the fourth dipole arm 320-2 of the second radiator 320 may be mounted on the fourth conductive structure 330-4, which is opposite the third conductive structure 330-3.

Each of the conductive structures 330 may be configured as a bent metal plate structure, such as an L-shaped metal plate structure. Each of the L-shaped metal plate structures may be formed of, for example, two metal flat plates disposed perpendicular to each other. Each of the conductive structures may, for example, have a length (in the forward direction F) that is about a quarter of a wavelength corresponding to the center frequency of the operating frequency band of the radiating element 300. Each of the conductive structures 330 is configured to support a dipole arm on one side, and is mounted on the feed board 230 and electrically connected to a ground layer of the feed board 230 on the other side.

Adjacent conductive structures 330 may be configured in such a way that the four conductive structures 330 are allowed to form a substantially cross shape. A feeding gap 340 is provided between each pair of adjacent conductive structures. As a result, four feeding gaps 340 may be formed. The feed lines may be disposed in the corresponding feeding gaps 340 so as to feed the dipole arms.

It should be understood that the conductive structures 330 may have any suitable shape. In some embodiments, the conductive structures 330 may each be coupled to the reflector 210. For example, the conductive structures 330 may be connected together by means of their respective ends close to the reflector 210 using a connection structure and then collectively electrically connected to the reflector 210. In other embodiments, the conductive structures 330 may be electrically connected to the reflector 210 through corresponding connection structures respectively. The connection structure may be in a variety of shapes, for example, it may be disc-shaped, cylindrical, prismatic, or the like.

The radiating element 300 may include a first feed line 350 and a second feed line 360. A schematic view of the first feed line 350 of the radiating element can be seen in FIG. 5. The first feed line 350 may be configured as a hook-shaped feed line that includes a first segment 354, a second segment 355, and a third segment 356. The third segment 356 is substantially parallel to the first segment 354, and the second segment 355 is connected to the first segment 354 and the third segment 356. The second segment 355 includes a middle portion that protrudes upwardly. The second feed line 360 may be identical to the first feed line 350, except that the second feed line 360 may include a middle portion that protrudes downwardly so that the first and second feed lines 350, 360 may cross without coming into contact with one another. The two hook-shaped feed lines 350, 360 may be mounted crosswise to each other, for example, disposed at approximately 90 degrees in a staggered manner, where the first segment 354 and the third segment 356 of each hook-shaped feed line 350, 360 may be placed in two feeding gaps 340 that are approximately 180 degrees opposite each other respectively, so that the first segment 354 and the third segment 356 of each hook-shaped feed line may each be located between two adjacent conductive structures 330 as a stripline segment.

The first segment 354 (hereinafter also referred to as a first stripline segment) of the first feed line 350 may be disposed in the first feeding gap 340 between the first conductive structure 330-1 and the fourth conductive structure 330-4, so that the first stripline segment may be configured to feed a first polarized RF signal to the first dipole arm 310-1 and the fourth dipole arm 320-2; the third segment 356 (hereinafter also referred to as a second stripline segment) of the first feed line 350 may be disposed in the second feeding gap 340 between the second conductive structure 330-2 and the third conductive structure 330-3, so that the second stripline segment may be configured to feed the first polarized RF signal to the second dipole arm 310-2 and the third dipole arm 320-1. Likewise, the first segment 354 (hereinafter also referred to as a third stripline segment) of the second feed line 360, which is mounted crosswise to, for example, staggered at approximately 90 degrees to the first feed line 350, may be disposed in the third feeding gap 340 between the first conductive structure 330-1 and the third conductive structure 330-3, so that the third stripline segment may be configured to feed a second polarized RF signal to the first dipole arm 310-1 and the third dipole arm 320-1; the third segment 356 (hereinafter also referred to as a fourth stripline segment) of the second feed line 360 may be disposed in the fourth feeding gap 340 between the second conductive structure 330-2 and the fourth conductive structure 330-4, so that the fourth stripline segment may be configured to feed the second polarized RF signal to the second dipole arm 310-2 and the fourth dipole arm 320-2.

In the radiating element 300 according to embodiments of the present invention, the feed lines 350 and 360 may each be electrically connected to a transmission line on the feed board 230. The feed lines 350, 360 may be soldered to corresponding pads on the feed board 230, for example, by means of lower ends of their respective first segments 354, and the pads are electrically connected to the RF transmission line feeding source 240 via transmission lines. In this way, the first feed line 350 may be configured to receive a first polarized (for example, +45° polarized) RF signal from the first RF transmission line feeding source and feed it to the first radiator 310 and the second radiator 320. Likewise, the second feed line 360 may be configured to receive a second polarized (for example, −45° polarized) RF signal from the second RF transmission line feeding source and feed it to the first radiator 310 and the second radiator 320. In other embodiments, the feed lines 350, 360 may also pass through the feed board 230 to be electrically connected to an inner conductor of a cable.

Referring to FIG. 6, the first feed line 350 and the second feed line 360 may form a first cross pattern, and the first axis m of the first radiator 310 and the second axis n of the second radiator 320 may form a second cross pattern, where the first cross pattern is rotated relative to the second cross pattern by, for example, approximately 45°. Each feed line 350, 360 can be electrically coupled to the four dipole arms through corresponding stripline segments, so as to feed RF signals to the four dipole arms at the same time, and the four dipole arms achieve a first polarization effect and/or a second polarization effect under a common action.

In the radiating element 300 according to embodiments of the present application, when the feed line for a first polarization is excited, the four radiators all participate in radiation. In some embodiments, the first radiator 310 of the radiating element 300 may extend horizontally, and the second radiator 320 of the radiating element 300 may extend vertically. When the feed lines are excited, the first radiator 310 extending horizontally and the second radiator 320 extending vertically both participate in radiation. By using vector combination, the desired polarization is obtained in a +/−45° direction, thereby achieving a +/−45° polarization effect.

The radiating element 300 may be a low-band radiating element 300 in some embodiments. In a multi-band, multi-array antenna (such as an antenna having two low-band linear arrays and two mid-band linear arrays), it is advantageous for the dipole arms of the low-band radiating element 300 to extend both horizontally and vertically, because this may reduce or eliminate situations where the dipole arms of the low-band radiating elements extend above the high-band radiating elements. A reduction in the area where portions of high-band radiating elements are directly below low-band radiating elements is beneficial to reduce the scattering effect of the low-band radiating elements 300 on the high-band antenna beams. In addition, the reduction in the coverage area can also reduce the radiant energy loss of the high-band linear arrays. Further, the high-band radiating elements can be further separated from the low-band radiating element 300, thereby reducing the coupling interference therebetween.

Next, a design of the radiator of the radiating element 300 according to some embodiments of the present invention will be described in more detail with reference to FIGS. 6 and 7.

As shown in FIG. 6, the dipole arms 310-1, 310-2, 320-1, and 320-2 may each be configured as an annular arm including at least one narrowed arm segment 370 and at least one widened arm segment 380. Each annular arm may include two conductive paths, wherein a first conductive path forms half of the generally elongated dipole arm and a second conductive path forms the other half of the dipole arm. An elongated dipole arm may be understood as: the length of each dipole arm 310-1, 310-2, 320-1, 320-2 is significantly greater than its width. In some embodiments, the lower limit of the ratio of a length to a width of the dipole arm is: 1.5, 1.75, 2, 2.25, 2.5, 3, 3.5, 4 or 5. In some embodiments, for example, in an narrow antenna having two low-band linear arrays and two high-band linear arrays, where the width may be less than 430 mm, 400 mm, 380 mm, or even 360 mm, the area of a high-band radiating element below covered by a low-band radiating element 300 in the forward direction may be, for example, less than 0.5, 0.4, 0.3, 0.2, and 0.1 times the area of the dipole arm of the low-band radiating element 300. It is also possible that there is no coverage of the high-band radiating element by the low-band radiating element 300 in the forward direction.

Each conductive path may comprise a metal pattern that has a widened arm segment 380 and a narrowed arm segment 370. The narrowed arm segment 370 may be implemented as a meandered arm segment to increase the path length thereof, thereby facilitating the compactness of the radiating element 300 and/or a desired filtering effect with respect to high-band radiation. The widened arm segment 380 may have a first width and the narrowed arm segment 370 may have a second width. The first width of each widened arm segment 380 and the second width of each narrowed arm segment 370 need not be constant, and hence in some instances reference will be made to the average widths of the widened arm segment 380 and the narrowed arm segment 370. The average width of each widened arm segment 380 may be, for example, at least twice the average width of each narrowed arm segment 370 in some embodiments. In other embodiments, the average width of each widened arm segment 380 may be, for example, at least three, four, five, six, eight, or ten times the average width of each narrowed arm segment 370.

The first conductive path and the second conductive path are spaced apart from each other at least over part of the segments, that is, there is a gap between the first conductive path and the second conductive path. In some cases, the gap between a first widened arm segment 380 of the first conductive path and a second widened arm segment 380 of the second conductive path opposite thereto may be 2.5, 2, 1.75, 1.5, 1.25, 1 or 0.5 times the first width of the widened arm segment 380. A small gap makes it possible to achieve an elongated dipole arm and therefore contributes to the compactness of the radiating element 300.

Further, the meandered narrowed arm segments 370 may be implemented as non-linear conductive segments, and may act as high impedance segments that interrupt currents in the high-band frequency range that could otherwise be induced on the dipole arm itself. As such, the narrowed arm segment 370 may reduce induced high-band currents on the low-band radiating elements 300, thereby further reducing the scattering effect of the low-band radiating element 300 on the high-band radiating element. The narrowed arm segments 370 may make the low-band radiating elements 300 almost invisible to the high-band radiating elements, and thus endows the low-band radiating elements 300 with a cloaking function. It is advantageous for the low-band radiating element 300 to have such a cloaking function because the less high-band current induced on the dipole arm of the low-band radiating element 300, the smaller impact on the radiation pattern characteristics of the linear array 220 of high-band radiating elements.

In some embodiments, all four dipole arms of the radiating element 300 may lie in a common plane that is generally parallel to a plane defined by the underlying reflector 210. The conductive structure of the radiating element 300 may extend in a direction that is generally perpendicular to the plane defined by the dipole arms.

In other embodiments, all four dipole arms of the radiating element 300 may be formed as non-planar elements. Referring to FIGS. 3 and 4, the widened arm segment 380 of the dipole arm may include a first widened arm subsegment 380-1 extending horizontally (in the view of FIG. 4) and a second widened arm subsegment 380-2 extending vertically (in the view of FIG. 4) from the first widened arm subsegment 380-1. In other embodiments, the second widened arm subsegment 380-2 may not be perpendicular to the first widened arm subsegment 380-1. For example, the second widened arm subsegment 380-2 may be connected to the first widened arm subsegment 380-1 at an inclination angle (such as 45 degrees, 60 degrees, 80 degrees, etc.). Further, the first widened arm subsegment 380-1 and/or the second widened arm subsegment 380-2 may have different shapes than shown such as, for example, a trapezoid shape, a triangular shape, or the like. Implementing radiating element 300 to have non-planar dipole arms may allow the dipole arms to have a desired electrical length while reducing the "footprint" of each radiator (i.e., the size of the radiator when viewed from the front of the antenna). This can further promote the miniaturization of the radiating element 300, and hence reduce the coverage area of the low-band radiating element 300 and the high-band radiating element in the forward direction.

Next, a variation of the radiating element 300 according to some embodiments of the present invention will be described with reference to FIG. 8.

Figure 8:
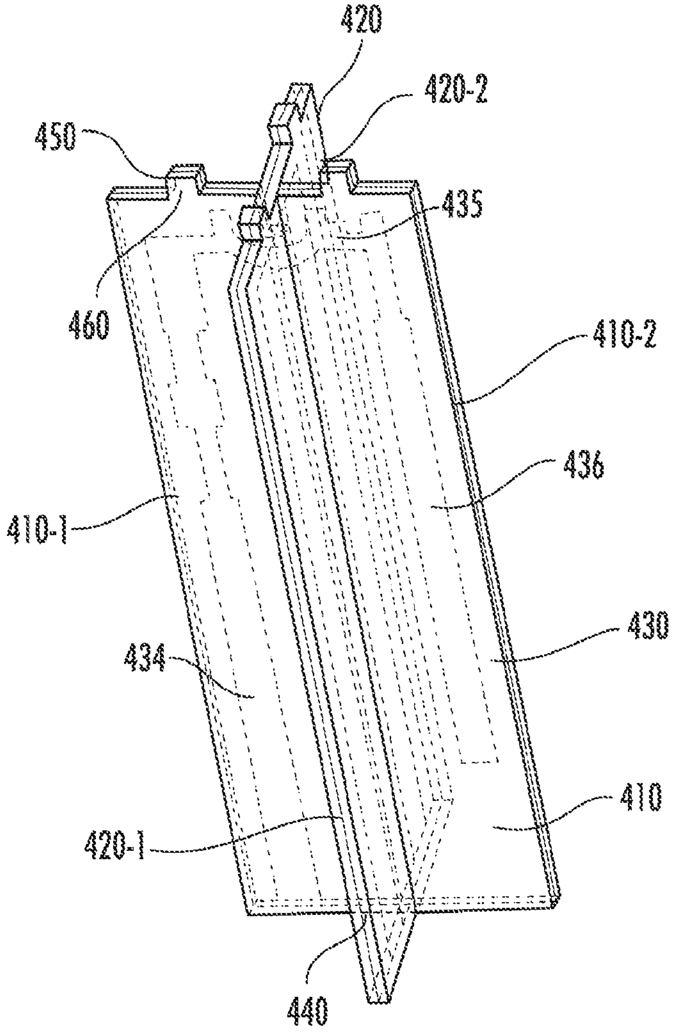
FIG. 8 is a schematic view of feeding structures of the radiating element according to some embodiments of the present invention.

As shown in FIG. 8, the radiating element 300 includes a cross-dipole radiator and a cross-feeding structure. The cross-feeding structure of the radiating element 300 includes a first feeding structure 410 and a second feeding structure 420 cross-engaged therewith. The first feeding structure 410 and the second feeding structure 420 may each be formed of a printed circuit board, such as a multilayer printed circuit board. The first feeding structure 410 has a first engaging slot in its end away from the reflector 210, and the second feeding structure 420 has a second engaging slot in its end close to the reflector 210, by both of which the first feeding structure 410 and the second feeding structure 420 may be cross-engaged with each other.

In the embodiment of FIG. 8, each feeding structure may be configured as a double-layer printed circuit board. The double-layer printed circuit board includes a metal pattern in the middle, two ground layers on two sides, and two dielectric layers interposed between the ground layer and the metal pattern respectively. The metal pattern in the middle includes a feed line (indicated by a dashed line in the figure), which is thus constructed as a stripline feed line. The first feeding structure 410 has a first feed line 430, and the second feeding structure 420 has a second feed line 440. The first feed line 430 and the second feed line 440 may each be configured as a substantially hook-shaped feed line. The first feed line 430 and the second feed line 440 each include a first segment 434, a second segment 435, and a third segment 436. The first segment 434 may be located in a first half of the corresponding feeding structure, and the third segment 436 may be in a second half of the corresponding feeding structure and may be substantially parallel to the first segment 434, and the second segment 435 is connected to the first segment 434 and the third segment 436.

Further, as shown in FIG. 8, the cross-feeding structure includes a plurality of protrusions 450 disposed on ends of halves of the feeding structure away from the reflector 210. These protrusions 450 may be configured for mounting of the cross-dipole radiators of the radiating element 300. For the design of the cross-dipole radiator of the radiating element 300, reference may be made to the related content as described above, and details are not described herein again. In some embodiments, the cross-dipole radiators may be designed as printed circuit board-based dipole radiators.

For mounting of the cross-dipole radiators of the radiating element 300, each protrusion 450 may have metal regions 460 on both sides, and the metal regions 460 may be part of the ground layer of the printed circuit board. The first dipole arm 310-1 of the first radiator 310 may be soldered to the protrusion 450 of the first half 410-1 of the first feeding structure 410 and the protrusion 450 of the first half 420-1 of the second feeding structure 420; the second dipole arm 310-2 of the first radiator 310 may be soldered to the protrusion 450 of the second half 410-2 of the first feeding structure 410 and the protrusion 450 of the second half 420-2 of the second feeding structure 420; the third dipole arm 320-1 of the second radiator 320 may be soldered to the protrusion 450 of the second half 410-2 of the first feeding structure 410 and the protrusion 450 of the first half 420-1 of the second feeding structure 420; and the fourth dipole arm 320-2 of the second radiator 320 may be soldered to the protrusion 450 of the first half 410-1 of the first feeding structure 410 and the protrusion 450 of the second half 420-2 of the second feeding structure 420.

Therefore, the first segment 434 of the first feed line (as a first stripline segment) may be configured to feed a first polarized RF signal to the first dipole arm 310-1 and the fourth dipole arm 320-2; the third segment 436 of the first feed line (as a second stripline segment) may be configured to feed the first polarized RF signal to the second dipole arm 310-2 and the third dipole arm 320-1. Likewise, the first segment 434 of the second feed line (as a third stripline segment) may be configured to feed a second polarized RF signal to the first dipole arm 310-1 and the third dipole arm 320-1; the third segment 436 of the second feed line (as a fourth stripline segment) may be configured to feed the second polarized RF signal to the second dipole arm 310-2 and the fourth dipole arm 320-2.

In the embodiment of FIG. 8, the first feed line and the second feed line form a first cross pattern, and the first axis m of the first radiator 310 and the second axis n of the second radiator 320 may form a second cross pattern, where the first cross pattern is rotated relative to the second cross pattern by approximately 45°. Each of the feed lines is capable of being electrically coupled with the four dipole arms, so as to feed RF signals to the four dipole arms at the same time, and the four dipole arms achieve a first polarization effect and/or a second polarization effect under a common action.

The feed lines may each be electrically connected to a transmission line on the feed board 230. Each of the feed lines may be soldered to a corresponding pad on the feed board 230, for example, by a lower end of their respective first segment 436, and the pad is electrically connected to the RF transmission line feeding source 240 via a transmission line. In this way, the first feed line may be configured to receive a first polarized (for example, +45° polarized) RF signal from the first RF transmission line feeding source 240 and feed it to the first radiator 310 and the second radiator 320. Likewise, the second feed line may be configured to receive a second polarized (for example, −45° polarized) RF signal from the second RF transmission line feeding source 240 and feed it to the first radiator 310 and the second radiator 320.

Figure 9:
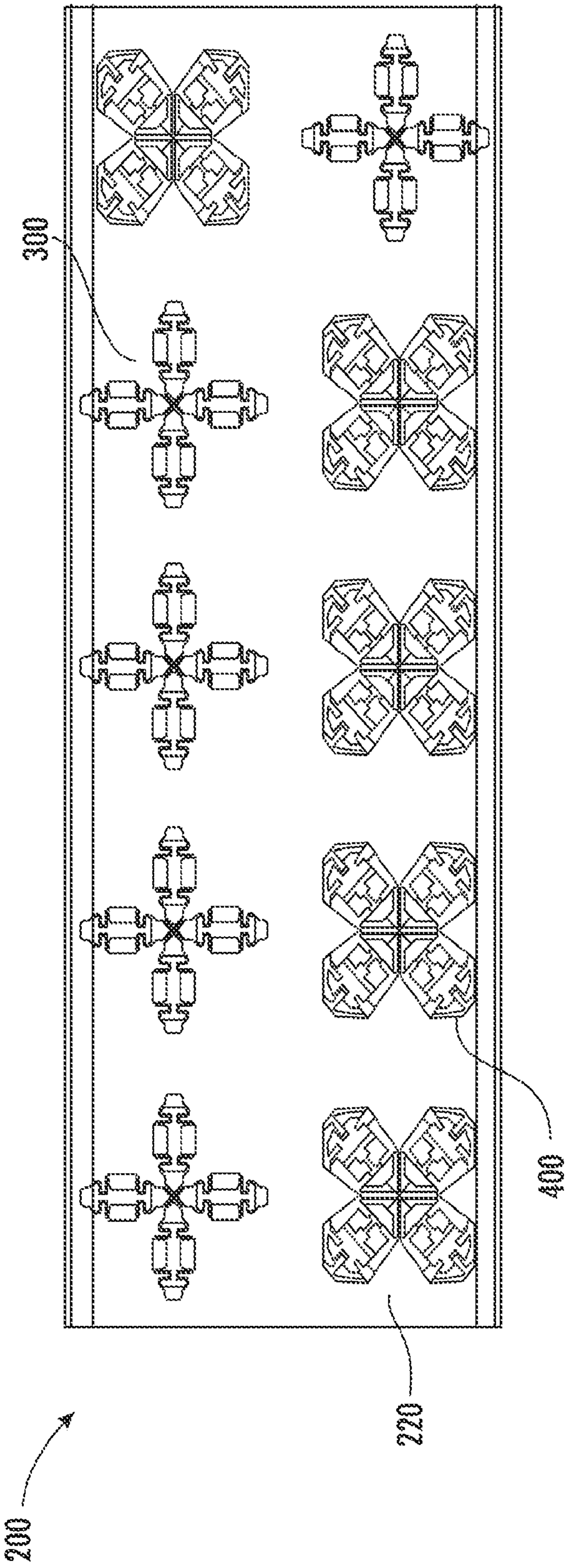
FIG. 9 is a schematic front view of another variation of the antenna assembly in the base station antenna of FIG. 1.

FIG. 9 is a schematic view of another variation of the antenna assembly 200. In this variation, two arrays 220 of different low-band radiating elements are used to provide enhanced isolation (for example, co-isolation between the arrays of low-band radiating elements).

As shown in FIG. 9, the antenna assembly 200 includes a first array 220 of low-band radiating elements 300 and a second array 220 of low-band radiating elements 400. The first array 220 of low-band radiating elements 300 may include a plurality of first radiating elements 300 according to embodiments of the present invention. The second array 220 of low-band radiating elements 400 may include a plurality of second radiating elements, which may be configured in such a way that the second radiating element includes: a third radiator extending at an angle of +45° and a fourth radiator extending at an angle of −45°, wherein the third radiator has a fifth dipole arm and a sixth dipole arm, and the fourth radiator has a seventh dipole arm and an eighth dipole arm. In order to improve their cloaking performances, the fifth and sixth dipole arms may each include narrowed arm segments and widened arm segments, and the seventh and eighth dipole arms may each include narrowed arm segments and widened arm segments.

As shown in FIG. 9, the first radiating elements 300 may be mounted adjacent the second radiating elements in the horizontal direction. It should be understood that the first array 220 of low-band radiating elements 300 and the second array 220 of low-band radiating elements 400 may be designed to be vertically aligned with each other. In other embodiments, the first array 220 of low-band radiating elements 300 and the second array 220 of low-band radiating elements 400 may be designed to be staggered from each other, that is, the feeding points of the radiating elements 300 and 400 are staggered in the vertical direction V, i.e., they are no longer aligned horizontally. This increases the spatial distance between the radiating elements 300 having the same polarization of adjacent radiators, thereby improving the isolation.

As the tip end of the horizontally-extending dipole arm of the radiating element 300 according to embodiments of the present invention points to a area between two radiators of the second radiating element 400, the physical spacing between the radiating elements of adjacent arrays may be increased.

Although exemplary embodiments of this disclosure have been described, those skilled in the art should appreciate that many variations and modifications are possible in the exemplary embodiments without materially departing from the spirit and scope of the present disclosure. Accordingly, all such variations and modifications are intended to be included within the scope of this disclosure as defined in the claims. The present disclosure is defined by the appended claims, and equivalents of these claims are also contained.

That which is claimed is:

1. A radiating element, comprising:

a first conductive structure, a second conductive structure, a third conductive structure and a fourth conductive structure;

a first radiator having a first dipole arm and a second dipole arm, wherein the first dipole arm and the second dipole arm each include a narrowed arm segment and a widened arm segment;

a second radiator having a third dipole arm and a fourth dipole arm, wherein the third dipole arm and the fourth dipole arm each include a narrowed arm segment and a widened arm segment;

a first feed line configured to feed a first polarized radio frequency signal to the first dipole arm, the second dipole arm, the third dipole arm, and the fourth dipole arm; and a second feed line configured to feed a second polarized radio frequency signal to the first dipole arm, the second dipole arm, the third dipole arm, and the fourth dipole arm, wherein the first dipole arm is mounted on the first conductive structure, the second dipole arm is mounted on the second conductive structure, the third dipole arm is mounted on the third conductive structure and the fourth dipole arm is mounted on the fourth conductive structure, and wherein a first segment of the first feed line is disposed between the first conductive structure and the fourth conductive structure, and a second segment of the first feed line is disposed between the second conductive structure and the third conductive structure.

2. The radiating element according to claim 1, wherein each dipole arm includes a first conductive path and a second conductive path, the first conductive path and the second conductive path each including at least one narrowed arm segment and at least one widened arm segment.

3. The radiating element according to claim 2, wherein the first conductive path and the second conductive path form a conductive loop.

4. The radiating element according to claim 1, wherein the widened arm segment in each dipole arm is a non-planar widened arm segment that includes a first widened arm subsegment extending in a first direction, and a second widened arm subsegment extending from the first widened arm subsegment in a second direction, wherein the second direction is different from the first direction.

5. The radiating element according to claim 1, wherein the first feed line and the second feed line form a first cross pattern, and the first radiator and the second radiator form a second cross pattern, wherein the first cross pattern is rotated at an angle relative to the second cross pattern.

6. The radiating element according to claim 5, wherein the first cross pattern is rotated with respect to the second cross pattern by 45°.

7. The radiating element according to claim 1, wherein the first radiator is configured as a vertically extending radiator, and the second radiator is configured as a horizontally extending radiator.

8. The radiating element according to claim 1, wherein a first segment of the second feed line is disposed between the first conductive structure and the third conductive structure, and a second segment of the second feed line is disposed between the second conductive structure and the fourth conductive structure.

9. A radiating element, comprising:

a first radiator having a first dipole arm and a second dipole arm, wherein the first dipole arm and the second dipole arm each include a narrowed arm segment and a widened arm segment;

a second radiator having a third dipole arm and a fourth dipole arm, wherein the third dipole arm and the fourth dipole arm each include a narrowed arm segment and a widened arm segment;

a first feed line configured to feed a first polarized radio frequency signal to the first dipole arm, the second dipole arm, the third dipole arm, and the fourth dipole arm; and a second feed line configured to feed a second polarized radio frequency signal to the first dipole arm, the second dipole arm, the third dipole arm, and the fourth dipole arm, wherein the first feed line includes a first stripline segment configured to feed the first polarized radio frequency signal to the first dipole arm and the fourth dipole arm, and a second stripline segment configured to feed the first polarized radio frequency signal to the second dipole arm and the third dipole arm; and the second feed line includes a third stripline segment configured to feed the second polarized radio frequency signal to the first dipole arm and the third dipole arm, and a fourth stripline segment configured to feed the second polarized radio frequency signal to the second dipole arm and the fourth dipole arm.

10. The radiating element according to claim 9, further comprising:

a first conductive structure, on which the first dipole arm is mounted;

a second conductive structure, on which the second dipole arm is mounted;

a third conductive structure, on which the third dipole arm is mounted; and a fourth conductive structure, on which the fourth dipole arm is mounted.

11. The radiating element according to claim 10, wherein:

the first stripline segment is disposed in a feeding gap between the first conductive structure and the fourth conductive structure, and the second stripline segment is disposed in a feeding gap between the second conductive structure and the third conductive structure; and the third stripline segment is disposed in a feeding gap between the first conductive structure and the third conductive structure, and the fourth stripline segment is disposed in a feeding gap between the second conductive structure and the fourth conductive structure.

12. The radiating element according to claim 9, wherein the radiating element includes a first feeding structure and a second feeding structure, the first feeding structure having a first engaging slot on an end away from the reflector, the second feeding structure having a second engaging slot on an end close to the reflector, and the first feeding structure and the second feeding structure being cross-engaged with each other by means of the first engaging slot and the second engaging slot.

13. The radiating element according to claim 12, wherein:

the first feeding structure includes a first metal pattern, two ground layers on each side of the first metal pattern, and two dielectric layers respectively between the ground layers and the first metal pattern, wherein the first metal pattern includes the first feed line; and the second feeding structure includes a second metal pattern, two ground layers on each side of the second metal pattern, and two dielectric layers respectively between the ground layers and the second metal pattern, wherein the second metal pattern includes the second feed line.

14. The radiating element according to claim 13, wherein the first feeding structure and the second feeding structure each include a first half and a second half, the first stripline segment being in the first half of the first feeding structure, and the second stripline segment being in the second half of the first feeding structure, the third stripline segment being in the first half of the second feeding structure, and the fourth stripline segment being in the second half of the second feeding structure.

15. An antenna assembly, comprising a reflector and an antenna array mounted on the reflector, the antenna array including a plurality of vertically extending arrays, characterized in that the plurality of vertically extending arrays include a first array including a plurality of first radiating elements, wherein the first radiating elements includes:

a first radiator extending vertically, the first radiator having a first dipole arm and a second dipole arm, wherein the first dipole arm and the second dipole arm each include a narrowed arm segment and a widened arm segment;

a second radiator extending horizontally, the second radiator having a third dipole arm and a fourth dipole arm, wherein the third dipole arm and the fourth dipole arm each include a narrowed arm segment and a widened arm segment;

a first feed line configured to feed a first polarized radio frequency signal to the first dipole arm, the second dipole arm, the third dipole arm, and the fourth dipole arm; and a second feed line configured to feed a second polarized radio frequency signal to the first dipole arm, the second dipole arm, the third dipole arm, and the fourth dipole arm, wherein the plurality of vertically extending arrays include a second array including a plurality of second radiating elements, wherein the second radiating element includes:

a third radiator extending at an angle of +45°, the third radiator having a fifth dipole arm and a sixth dipole arm; and a fourth radiator extending at an angle of −45°, the fourth radiator having a seventh dipole arm and an eighth dipole arm.

16. The antenna assembly according to claim 15, wherein the fifth and sixth dipole arms each include a narrowed arm segment and a widened arm segment, and the seventh and eighth dipole arms each include a narrowed arm segment and a widened arm segment.

17. The antenna assembly according to claim 15, wherein the first radiating elements in the first array and the second radiating elements in the second array are disposed adjacent to each other in a horizontal direction.

* * * * *